United States Patent
Patel et al.

(10) Patent No.: US 9,319,348 B2
(45) Date of Patent: Apr. 19, 2016

(54) OCTAL SERIAL GIGABIT MEDIA-INDEPENDENT INTERFACE

(75) Inventors: Sandeep Arvindkumar Patel, Los Gatos, CA (US); Anoop Vetteth, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 106 days.

(21) Appl. No.: 13/114,210

(22) Filed: May 24, 2011

(65) Prior Publication Data
US 2012/0300792 A1    Nov. 29, 2012

(51) Int. Cl.
H04L 12/935    (2013.01)
H04L 29/08    (2006.01)
H04L 12/931    (2013.01)

(52) U.S. Cl.
CPC ............. *H04L 49/30* (2013.01); *H04L 69/324* (2013.01); *H04L 49/351* (2013.01)

(58) Field of Classification Search
USPC ........................................................ 370/426
See application file for complete search history.

(56) References Cited

U.S. PATENT DOCUMENTS

| | | |
|---|---|---|
| 6,108,726 A | 8/2000 | Runaldue et al. |
| 6,269,104 B1 | 7/2001 | McLaughlin et al. |
| 6,275,501 B1 | 8/2001 | Lucas et al. |
| 6,690,682 B1* | 2/2004 | Giaretta et al. ............... 370/535 |
| 7,418,514 B1 | 8/2008 | Lo et al. |
| 7,532,605 B2 | 5/2009 | Wakeley et al. |
| 7,639,655 B2 | 12/2009 | Bione |
| 7,672,300 B1* | 3/2010 | Medina et al. ................ 370/366 |
| 8,060,681 B2 | 11/2011 | Russo et al. |
| 8,230,150 B2 | 7/2012 | Russo et al. |
| 8,356,190 B2 | 1/2013 | Diab |
| 8,441,957 B2 | 5/2013 | Baumer et al. |
| 2006/0273819 A1* | 12/2006 | Opperman et al. ............. 326/14 |
| 2007/0160087 A1* | 7/2007 | Findlater et al. ............... 370/498 |
| 2008/0095218 A1* | 4/2008 | Murray et al. ................ 375/150 |
| 2011/0249687 A1* | 10/2011 | Diab et al. .................... 370/474 |

* cited by examiner

*Primary Examiner* — Huy D Vu
*Assistant Examiner* — Bao G Nguyen
(74) *Attorney, Agent, or Firm* — Baker Botts L.L.P.

(57) ABSTRACT

In one embodiment, a method includes receiving one or more parallel data streams having a first data rate, multiplexing by round-robin selection the parallel data streams into a single serial data stream, modifying the serial data stream by passing it through a self-synchronous scrambler, and transmitting to a receiver across a transmission line the modified serial data stream at a second data rate that is approximately equal to ten times the first data rate.

27 Claims, 5 Drawing Sheets

OCTAL SERIAL GIGABIT MEDIA-INDEPENDENT INTERFACE

TECHNICAL FIELD

The present disclosure generally relates to MAC-PHY interfaces in networking components.

BACKGROUND

A media access control layer (MAC) may include a serial interface for interfacing to the physical layer (PHY) circuitry of a network interface card (NIC) or other networking components. In computer network systems, there is typically a natural division between chips handling the physical layer, which is responsible for transmitting data on the network, and the system chips, which perform logical operations with data transmitted on the network. Ethernet hubs, routers, and switches typically include multiple ports and may be referred to as multi-port Ethernet devices. Each port typically includes a system chip, which includes an MAC and a PHY. Modern multi-port Ethernet devices typically integrate multiple MACs into one system chip (MAC chip) as well as multiple PHYs into another chip (PHY chip). An interface may be needed on each chip to transfer signals between the MACs and the PHYs.

Institute of Electrical and Electronics Engineers (IEEE) Standard 802.3u defines a media-independent interface (MII) between an MAC and a PHY that includes 16 pins used for data and control. As noted above, in devices that include multiple ports that each have an MAC and a PHY, it is common to implement multiple MACs on one chip and multiple PHYs on another chip. If the standard MII, which includes 16 pins for data and control, is used for each MAC and PHY on the MAC chip and the PHY chip, the number of pins required for each chip becomes large as multiple MACs and PHYs are included on single chips.

DESCRIPTION OF EXAMPLE EMBODIMENTS

Overview

In one embodiment, a method includes receiving one or more parallel data streams having a first data rate, multiplexing by round-robin selection the parallel data streams into a single serial data stream, modifying the serial data stream by passing it through a self-synchronous scrambler, and transmitting to a receiver across a transmission line the modified serial data stream at a second data rate that is approximately equal to ten times the first data rate.

Description

Figure 1:
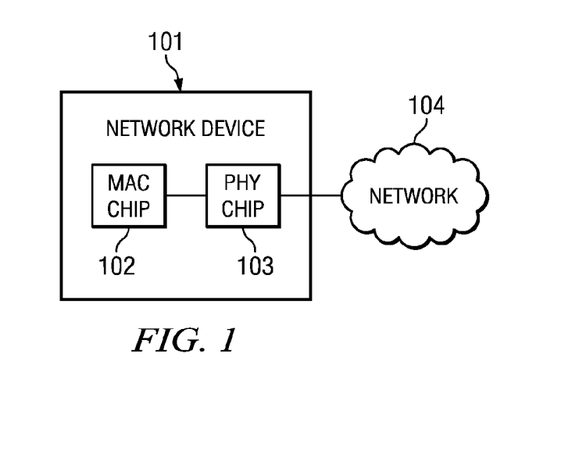
FIG. 1 illustrates an example network device.

FIG. 1 illustrates an example network device 101 connected to an example network 104. Although this disclosure describes and illustrates a particular network device 101, this disclosure contemplates any suitable network device 101. Network device 101 may be a network node, such as a redistribution point, communication endpoint, or other connection point. Network device 101 may include data circuit-terminating equipment (DCE), data terminal equipment (DTE), or both. Network device 101 may include a modem, hub, bridge, gateway, switch, router, server, or other suitable network device 101 or a combination of two or more of these. Network device 101 may contain multiple ports, and each port may include a system chip, which may include an MAC and a PHY. In particular embodiments, multi-port Ethernet devices may integrate multiple MACs into one system chip (MAC chip 102) and multiple PHYs into another chip (PHY chip 103) and an interface may be needed on each chip to transfer signals between the MAC and PHY chips. Multiple MAC and PHY chips may also be integrated on a single chip.

This disclosure contemplates any suitable network 104. As an example and not by way of limitation, one or more portions of network 104 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 104 may include one or more networks.

Figure 2:
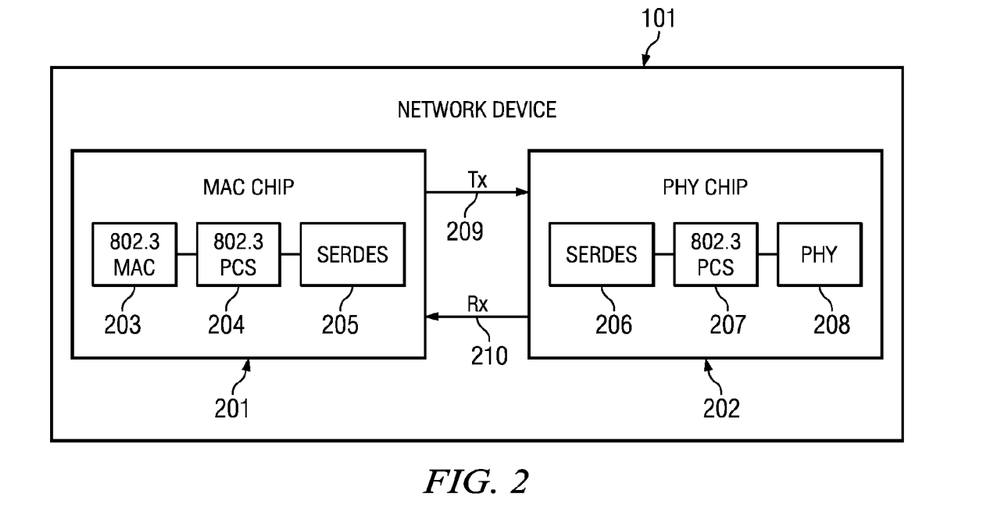
FIG. 2 illustrates an example MAC-PHY interface of the network device of FIG. 1.

FIG. 2 illustrates an example MAC-PHY interface of an example network device 101. In network device 101, eight ports are integrated into a single MAC chip 201 and eight ports are integrated into a single PHY chip 202. MAC chip 201 and PHY chip 202 are connected by TX and RX serial links 209 and 210. MAC chip 201 includes an 802.3 MAC module 203, an 802.3 Physical Coding Sublayer (PCS) module 204, and a serial/deserializer (SERDES) 205. PHY chip 202 includes an SERDES 206, 802.3 PCS module 207, and a PHY module 208. Though SERDESs 205 and 206 are logically separate, in particular embodiments, the SERDES 205 and 206 are the same chip. Each of TX and RX serial links 209 and 210 carries multiplexed data for all eight ports. The transmit and receive data paths leverage a modified 1000BASE-SX PCS defined in IEEE Standard 802.3z. The traditional Gigabit Media Independent Interface (GMII) data transmit/receive signals (TXD/RXD), data valid signals (TX_EN/RX_DV), and error signals (TX_ER/RX_ER) are encoded, serialized, and output with the appropriate double data rate (DDR) clocking, as discussed further below.

Figure 3:
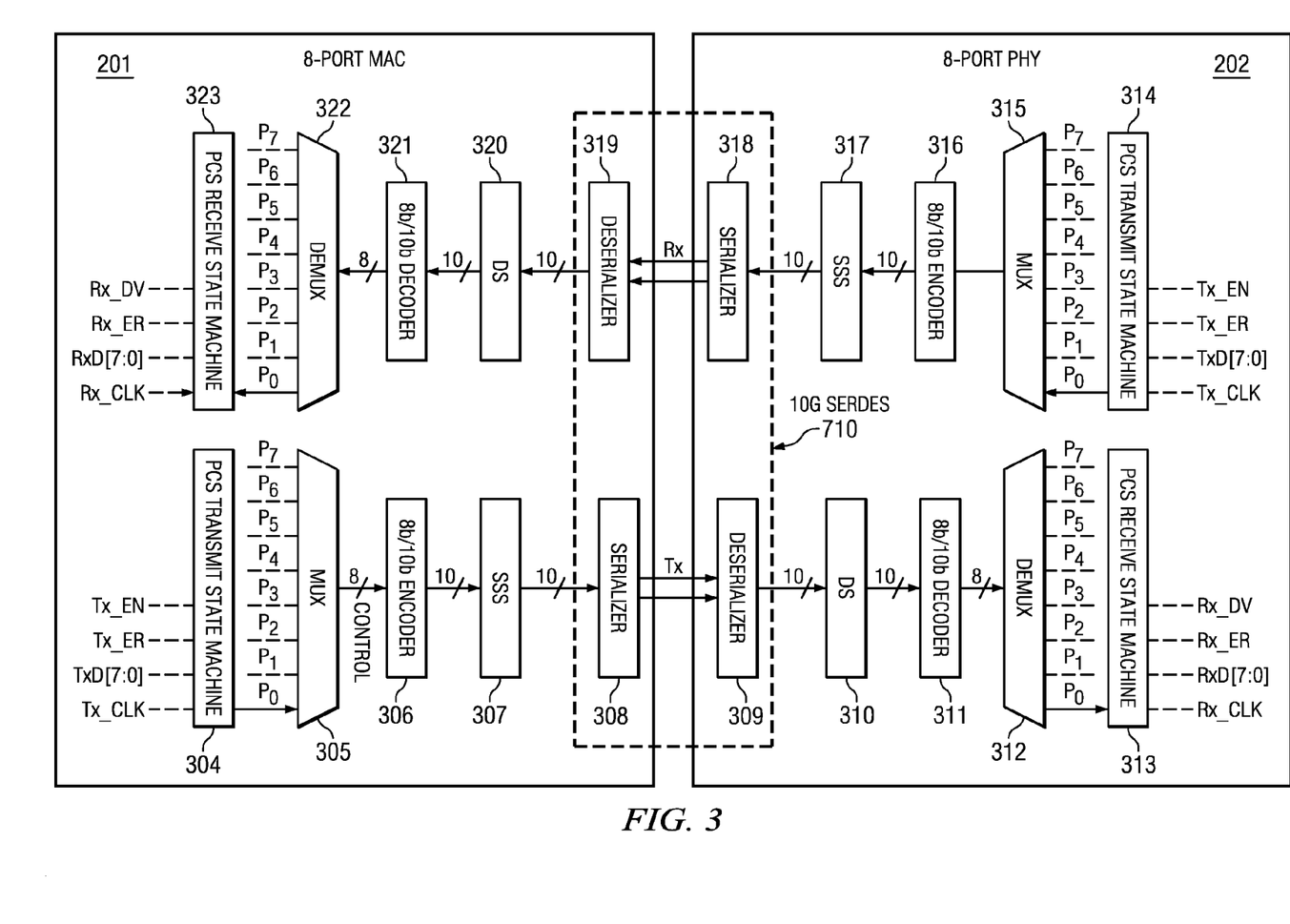
FIG. 3 illustrates example internal circuitry of the network device of FIG. 1.

FIG. 3 illustrates example internal circuitry of network device 101. Each MAC chip 201 has eight ports P0-P7. These eight ports comprise the 802.3 MAC block 203. Each port has its own PCS Transmit state machine 304 and PCS receive state machine 323 (only the PCS state machines for P0 are shown). These 16 logical elements (1 PCS transmit state machine and 1 PCS receive state machine for each of eight ports) comprise 802.3 PCS block 204. For each PCS state machine, four lines of data are multiplexed onto a single line. At the PCS transmit state machines, the 8-bit transmit data (TXD[7:0]), transmit enable (TX_EN), transmit error (TX_ER), and clock (TX_CLK) are multiplexed, encoded, and serialized onto a single line. Similarly, at the PCS receive state machines, the single line of data is demultiplexed into four channels (RX_DV, RX_ER, RXD[7:0], and RX_CLK). These serial data signals are referred to as GMII signals, and the interface carrying these GMII signals is known as a serial gigabit media independent interface (SGMII). The SGMII specification transmits data between the MAC and PHY using two lines, a data line and a clock line. The GMII signals are passed to the physical medium for transmission from the MAC on the TX path, and similarly, received from the PHY at the MAC RX path. In particular embodiments, carrier sense (CRS) is derived/inferred from RX_DV, and collision (COL) is logically derived in the MAC when the RX_DV and TX_EN are simultaneously asserted. In particular embodiments, there is a small block in the PHY transmit path to suppress TX_ER in full duplex mode when TX_EN is not asserted. Since eight 1.25 SGMII ports are interleaved onto a single link, the data rate becomes 10 Gbps.

In particular embodiments, between the MAC and the PHY, two data signals in each direction are used to convey frame data and link rate information between a multi-port 10/100/1000 PHY and Ethernet MAC. In particular embodiments, the data signals operate at 10.3125 Gbps using clock data recovery (CDR) technology to recover the clock at the MAC and PHY interfaces. Due to the high speed of operation, each of these signal pairs are realized as differential pairs, thus optimizing signal integrity while minimizing system noise.

Data being transferred from MAC ports P0-P7 to PHY chip 202 are first multiplexed together by multiplexer 305. In particular embodiments, multiplexer 305 combines the eight channels of data in a round-robin fashion into a single 8-bit data+control channel. The operation of multiplexer 305 is described in further detail in FIG. 4. In particular embodiments, each of MAC ports P0-P7 operates at 1 Gigabit/sec, and thus the multiplexer outputs at a data rate of eight times the individual port data rate, or 8G. The 8-bit data+control stream is then passed through 8b/10b encoder 306, further described in FIG. 5. In the embodiment utilizing 8b/10b encoding, because the 8b/10b encoding introduces 25% additional overhead, in order to maintain the 1G data rate of each of the eight individual ports (the 8G data rate from the multiplexer), the encoder must output data at a rate of 10 Gbps. In particular embodiments, the 8b/10b encoding occurs before multiplexing, and 8b/10b encoding occurs after de-multiplexing. In particular embodiments, the 8b/10b encoding is part of PCS state machines 204 and 207. The 10-bit wide data stream is then passed to self-synchronous scrambler (SSS) 307. In particular embodiments, SSS 307 optionally utilizes 64/66 encoding to maintain DC bias on the line, and therefore there is an additional 2 bits of overhead added per 64 bits. In such an embodiment, in order to maintain the same 10 Gbps data rate, the data must be outputted from the SSS at a rate of 10.3125 Gbps. This data is then passed to serializer 308 and converted into a serial data stream.

At the PHY side, the serial data stream is first deserialized by deserializer 309. In particular embodiments, the data is then fed through descrambler 310 that decodes the 66 bit 64/66 encoded symbols into 64 or 56 bit data symbols. In particular embodiments, the 10-bit wide data stream is then passed through decoder 311 that decodes the 10-bit 8b/10b encoded symbols into eight bits of data. The 8-bit data stream is then fed through demultiplexer 312 to be separated into eight parallel data streams. Each data stream is passed to its own PCS Receive state machine 313 (although only the PCS state machine for port 0 (P0) is shown), and the 8-bit received GMII data symbols (RXD) are then passed to the physical medium.

The process is identical for data passed from the transmission medium to the network device MAC through the MAC-PHY interface. The operation of serializers 308, 318 and deserializers 309, 319 can be implemented with a single 10G serializer/deserializer chip (SERDES). Thus, a single 10G SERDES 710 can implement an 8-port MAC-PHY interface. Utilizing this configuration, a 96-port Ethernet switch may be implemented with only 12 SERDES chips. In current implementations using quad-serial gigabit media independent interfaces (QSGMII) that multiplex four ports of data into a single interface, such a switch would require 24 SERDES chips. The cost Gigabit Ethernet device ASICs is therefore greatly reduced.

Figure 4:
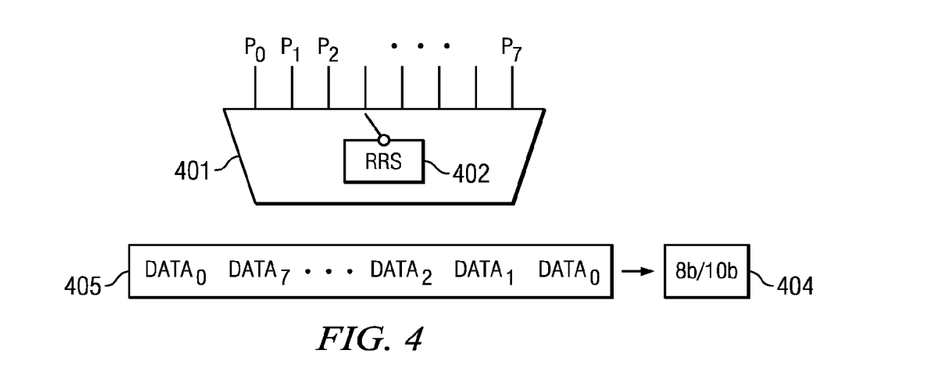
FIG. 4 illustrates an example round-robin selector for multiplexing data.

FIG. 4 illustrates an example of multiplexers 311 and 312. Multiplexers 311 and 312 utilize a round-robin multiplexing scheme to combine eight parallel streams of data into a single 8-bit wide data stream. Ports P0-P7, each already carrying 8 bits of multiplexed serial data from its own PCS state machine, pass data to multiplexer 401. In particular embodiments, multiplexer 401 includes round-robin selector (RRS) 402. RRS 402 takes single bits from the data streams from ports P0-P7 sequentially to construct data stream 405. As depicted, data stream 405 includes a bit from P0 (Data0), then a bit from P1 (Data1), sequentially until P7 (Data7), and then starts over at P0. In particular embodiments, data stream 405 is fed to 8b/10b encoders 306 and 316.

Figure 5:
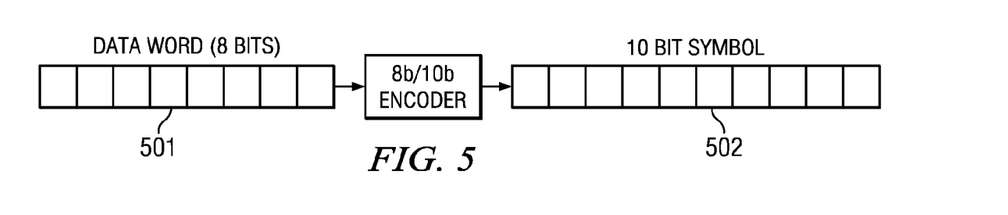
FIG. 5 illustrates an example encoding scheme for converting an eight-bit data word to a 10-bit symbol.

FIG. 5 illustrates the operation of 8b/10b encoders 306 and 316. 8b/10b encoding is implemented in the PCS of the 802.3z specification. The encoding method merely takes an 8-bit data word and converts it to a 10 bit symbol to achieve DC balance and bounded disparity. 8b/10b encoding, as known in the art, takes an 8-bit data word 501 and converts it to a 10-bit symbol 502. The low 5 bits of data are encoded into a 6-bit group (the 5b/6b portion) and the top 3 bits are encoded into a 4-bit group (the 3b/4b portion). These code groups are concatenated together to form the 10-bit symbol that is transmitted on the wire. The data symbols are often referred to as D.x.y where x ranges over 0-31 and y over 0-7. Standards using the 8b/10b encoding also define up to 12 special symbols (or control characters) that can be sent in place of a data symbol. They are often used to indicate start-of-frame, end-of-frame, link idle, skip and similar link-level conditions. At least one of them (i.e. a "comma" symbol) needs to be used to define the alignment of the 10 bit symbols. They are referred to as K.x.y and have different encodings from any of the D.x.y symbols.

Because 8b/10b encoding uses 10-bit symbols to encode 8-bit words, some of the possible 1024 (10 bit, 210) codes can be excluded to grant a run-length limit of 5 consecutive equal bits and grant that the difference of the count of 0s and 1s is no more than 2. Some of the 256 possible 8-bit words can be encoded in two different ways. Using these alternative encodings, the scheme is able to affect long-term DC-balance in the serial data stream. This permits the data stream to be transmitted through a channel with a high-pass characteristic, for example Ethernet's transformer-coupled unshielded twisted pair or optical receivers using automatic gain control. The disclosed embodiment utilizes 8b/10b encoding, but the disclosure contemplates other encoding schemes.

Figure 6:
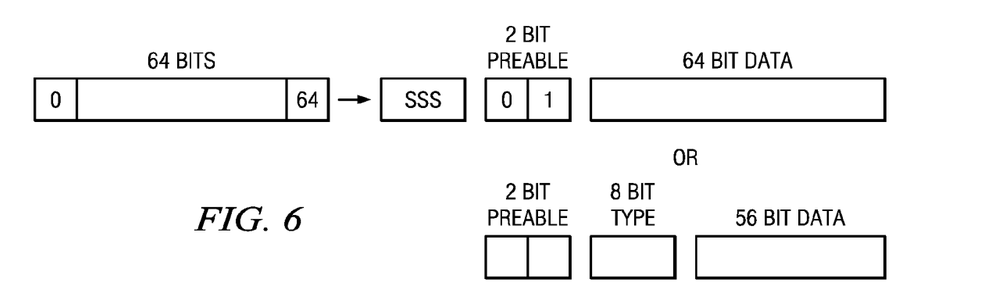
FIG. 6 illustrates an example self-synchronous scrambler.

FIG. 6 illustrates the operation of self-synchronous scramblers 307 and 317. SSS first converts 64 bits of data into a 66-bit word consisting of a 2-bit preamble and 64 bits of data, or a 2-bit preamble, 8-bit type field, followed by 56-bits of control information or data. Then, the 56 or 64 bits of data are scrambled using a self-synchronous scrambler function so that a relatively equal distribution of 1s and 0s are found in the data stream. In particular embodiments, the scrambling may be done in hardware, for example, with a linear feedback shift register, or in software. Though this embodiment discloses 64b/66b encoding, other encoding and scrambling mechanisms may be contemplated by one of ordinary skill in the art.

Figure 7:
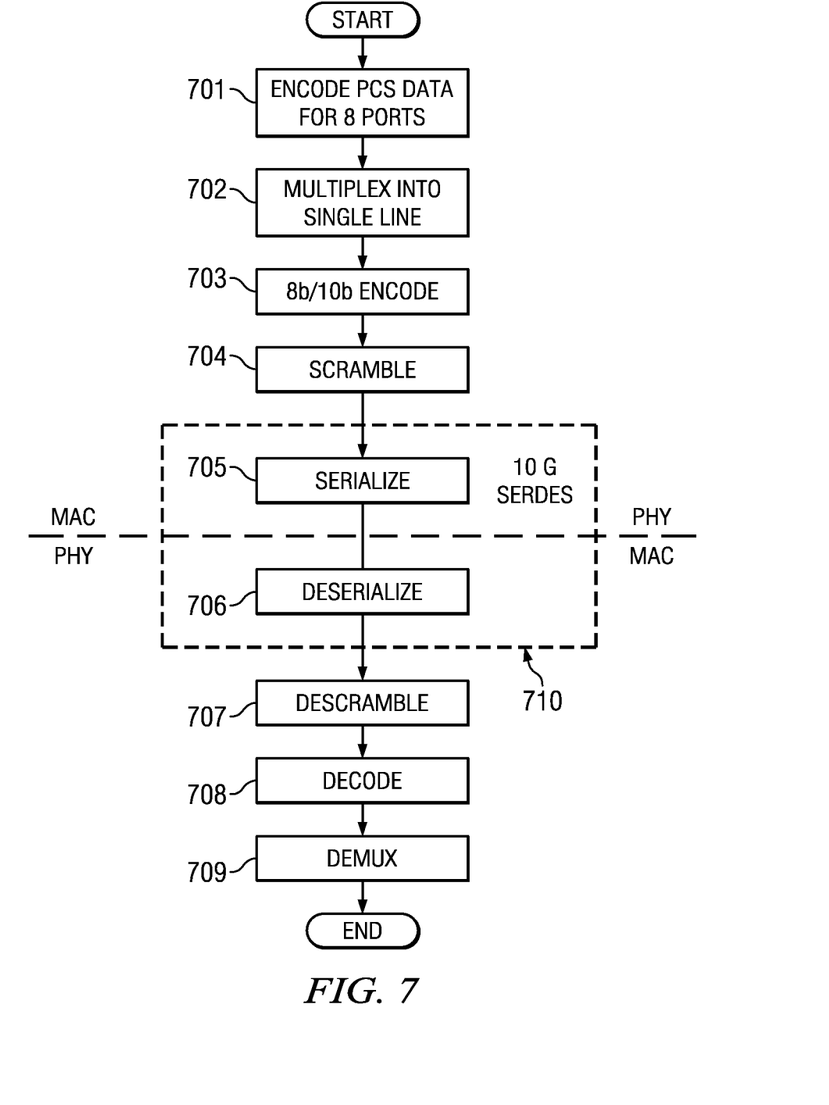
FIG. 7 illustrates an example method for transmitting eight lines of data between an MAC-PHY serial interface.

FIG. 7 illustrates an example method for transmitting eight ports of data from a MAC to a PHY or vice versa. The process flow is substantially the same as the description of FIG. 3. At step 701, data from the TX side of the MAC chip or the TX side of the PHY chip is encoded by a PCS state machine for each port into a single data stream. At step 702, the eight streams of parallel data are multiplexed into a single stream of data. In particular embodiments, this is achieved through the use of a round-robin selector. At step 703, the single serial stream of data is passed through an 8b/10b encoder as discussed in FIG. 5. In step 704, the serial data stream is passed through a scrambler 705 as discussed in FIG. 6. At step 705, the data is serialized and sent to the PHY from the MAC or vice versa, to be deserialized in step 706. Note that both serialization 705 and deserialization 706 for the MAC-PHY transmit/receive path and the PHY-MAC transmit/receive path may be implemented with a single 10G SERDES chip 710. On the receive side, the data is descrambled in step 707. At step 708, the descrambled serial data stream is decoded. In particular embodiments, the decoding is 10b/8b decoding. Finally, the serial data stream is demuxed in step 709 into eight parallel streams.

Figures 8, 9:
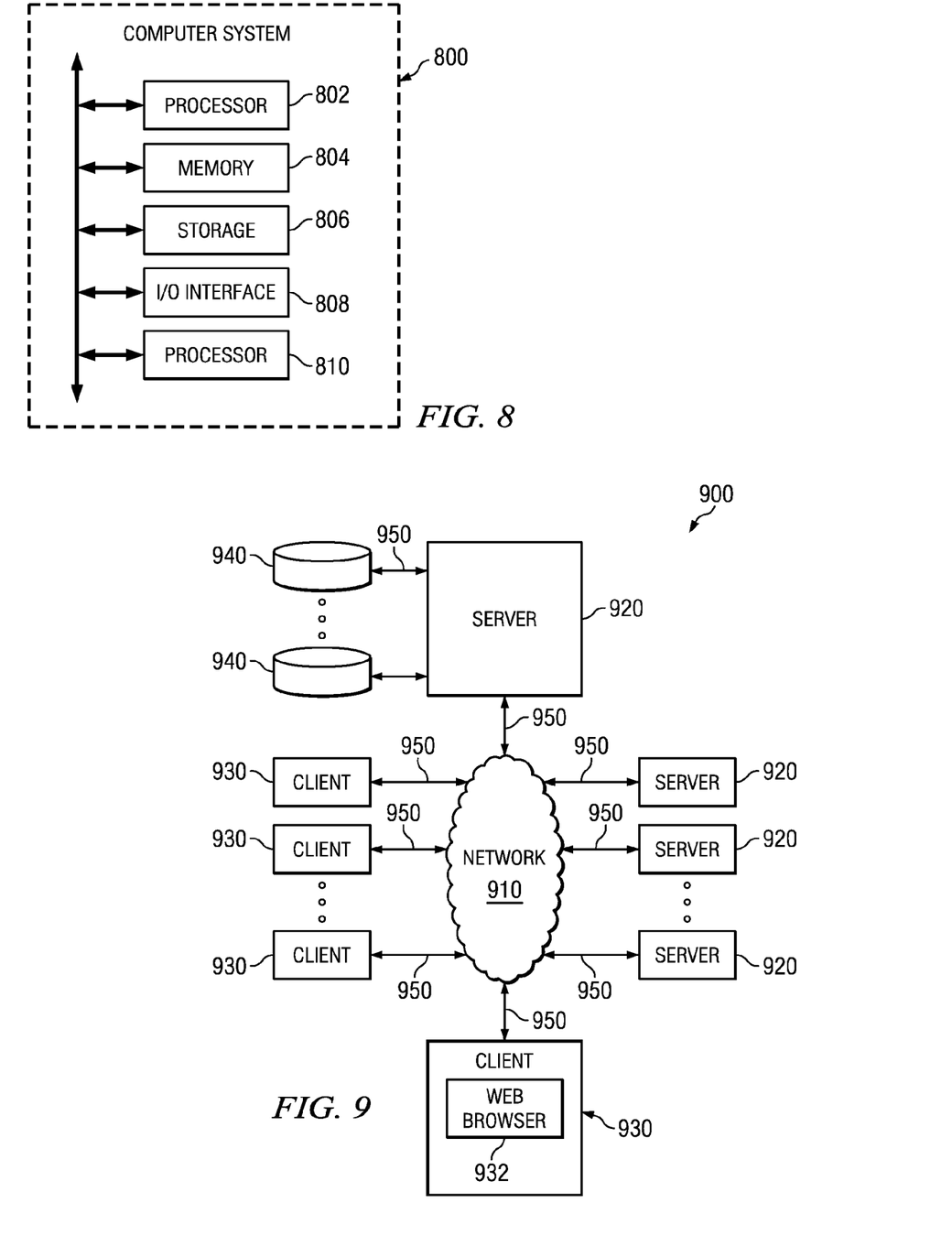
FIG. 8 illustrates an example computer system.
FIG. 9 illustrates an example network environment.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple datacenters; or reside in a cloud, which may include one or more cloud components in one or more networks. Where appropriate, one or more computer systems 800 may perform without substantial spatial or temporal limitation one or more steps of one or more more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, an FPGA or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 802 (such as, for example, one or more internal registers or caches), one or more portions of memory 804, one or more portions of storage 806, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

FIG. 9 illustrates an example network environment 900. This disclosure contemplates any suitable network environment 900. As an example and not by way of limitation, although this disclosure describes and illustrates a network environment 900 that implements a client-server model, this disclosure contemplates one or more portions of a network environment 900 being peer-to-peer, where appropriate. Particular embodiments may operate in whole or in part in one or more network environments 900. In particular embodiments, one or more elements of network environment 900 provide functionality described or illustrated herein. Particular embodiments include one or more portions of network environment 900. Network environment 900 includes a network 910 coupling one or more servers 920 and one or more clients 930 to each other. This disclosure contemplates any suitable network 910. As an example and not by way of limitation, one or more portions of network 910 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 910 may include one or more networks 910.

Links 950 couple servers 920 and clients 930 to network 910 or to each other. This disclosure contemplates any suitable links 950. As an example and not by way of limitation, one or more links 950 each include one or more wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) links 950. In particular embodiments, one or more links 950 each includes an intranet, an extranet, a VPN, a LAN, a WLAN, a WAN, a MAN, a communications network, a satellite network, a portion of the Internet, or another link 950 or a combination of two or more such links 950. Links 950 need not necessarily be the same throughout network environment 900. One or more first links 950 may differ in one or more respects from one or more second links 950.

This disclosure contemplates any suitable servers 920. As an example and not by way of limitation, one or more servers 920 may each include one or more advertising servers, applications servers, catalog servers, communications servers, database servers, exchange servers, fax servers, file servers, game servers, home servers, mail servers, message servers, news servers, name or DNS servers, print servers, proxy servers, sound servers, standalone servers, web servers, or web-feed servers. In particular embodiments, a server 920 includes hardware, software, or both for providing the functionality of server 920. As an example and not by way of limitation, a server 920 that operates as a web server may be capable of hosting websites containing web pages or elements of web pages and include appropriate hardware, software, or both for doing so. In particular embodiments, a web server may host HTML or other suitable files or dynamically create or constitute files for web pages on request. In response to a Hyper Text Transfer Protocol (HTTP) or other request from a client 930, the web server may communicate one or more such files to client 930. As another example, a server 920 that operates as a mail server may be capable of providing e-mail services to one or more clients 930. As another example, a server 920 that operates as a database server may be capable of providing an interface for interacting with one or more data stores (such as, for example, data stores 990 described below). Where appropriate, a server 920 may include one or more servers 920; be unitary or distributed; span multiple locations; span multiple machines; span multiple datacenters; or reside in a cloud, which may include one or more cloud components in one or more networks.

In particular embodiments, one or more links 950 may couple a server 920 to one or more data stores 940. A data store 940 may store any suitable information, and the contents of a data store 940 may be organized in any suitable manner. As an example and not by way or limitation, the contents of a data store 940 may be stored as a dimensional, flat, hierarchical, network, object-oriented, relational, XML, or other suitable database or a combination or two or more of these. A data store 940 (or a server 920 coupled to it) may include a database-management system or other hardware or software for managing the contents of data store 940. The database-management system may perform read and write operations, delete or erase data, perform data deduplication, query or search the contents of data store 940, or provide other access to data store 940.

In particular embodiments, one or more servers 920 may each include one or more search engines 922. A search engine 922 may include hardware, software, or both for providing the functionality of search engine 922. As an example and not by way of limitation, a search engine 922 may implement one or more search algorithms to identify network resources in response to search queries received at search engine 922, one or more ranking algorithms to rank identified network resources, or one or more summarization algorithms to summarize identified network resources. In particular embodiments, a ranking algorithm implemented by a search engine 922 may use a machine-learned ranking formula, which the ranking algorithm may obtain automatically from a set of training data constructed from pairs of search queries and selected Uniform Resource Locators (URLs), where appropriate.

In particular embodiments, one or more servers 920 may each include one or more data monitors/collectors 924. A data monitor/collection 924 may include hardware, software, or both for providing the functionality of data collector/collector 924. As an example and not by way of limitation, a data monitor/collector 924 at a server 920 may monitor and collect network-traffic data at server 920 and store the network-traffic data in one or more data stores 940. In particular embodiments, server 920 or another device may extract pairs of search queries and selected URLs from the network-traffic data, where appropriate.

This disclosure contemplates any suitable clients 930. A client 930 may enable a user at client 930 to access or otherwise communicate with network 910, servers 920, or other clients 930. As an example and not by way of limitation, a client 930 may have a web browser, such as MICROSOFT INTERNET EXPLORER or MOZILLA FIREFOX, and may have one or more add-ons, plug-ins, or other extensions, such as GOOGLE TOOLBAR or YAHOO TOOLBAR. A client 930 may be an electronic device including hardware, software, or both for providing the functionality of client 930. As an example and not by way of limitation, a client 930 may, where appropriate, be an embedded computer system, an SOC, an SBC (such as, for example, a COM or SOM), a desktop computer system, a laptop or notebook computer system, an interactive kiosk, a mainframe, a mesh of computer systems, a mobile telephone, a PDA, a netbook computer system, a server, a tablet computer system, or a combination of two or more of these. Where appropriate, a client 930 may include one or more clients 930; be unitary or distributed; span multiple locations; span multiple machines; span multiple datacenters; or reside in a cloud, which may include one or more cloud components in one or more networks.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computer systems:
   receiving, from a single chip, eight parallel data streams having a first data rate;
   multiplexing by round-robin selection the eight parallel data streams into a single multiplexed data stream having the eight parallel data streams;
   maintaining DC bias on the multiplexed data stream having the eight parallel data streams by encoding the multiplexed data stream having the eight parallel data streams using a single self-synchronous scrambler;
   serializing the modified multiplexed data stream, by a single serializer/deserializer chip, into a serial data stream having a second data rate that is approximately equal to ten times the first data rate; and
   transmitting to a receiver the modified serial data stream at the second data rate.

2. The method of claim 1, wherein the parallel data streams comprise a 10-bit data width encoding eight-bit symbols.

3. The method of claim 1, wherein the transmitter is in a media-access control chip and transmits to a PHY chip that interfaces with a physical transmission medium.

4. The method of claim 1, wherein the transmitter is in a PHY chip that interfaces with a physical transmission medium, and transmits to a media-access control chip.

5. The method of claim 1, wherein the second data rate is approximately equal to 10.3125 times the first data rate.

6. A method comprising, by one or more computer systems:
   receiving, from a single chip, eight parallel data streams having a first data rate;
   multiplexing by round-robin selection the eight parallel data streams into a first single multiplexed data stream having the eight parallel data streams;
   maintaining DC bias on the multiplexed data stream having the eight parallel data streams by encoding the multiplexed data stream having the eight parallel data streams using a single self-synchronous scrambler;
   serializing the modified multiplexed data stream, by a single serializer/deserializer chip, into a serial data stream having a second data rate that is approximately equal to ten times the first data rate;
   transmitting to a receiver the serial data stream at the second data rate;
   receiving, at the receiver coupled to a transmitter, the serial data stream;
   de-serializing, by a single serializer/deserializer chip, the serial data stream into a second single multiplexed data stream;
   de-multiplexing, through a de-multiplexer, the second single multiplexed data stream into eight received parallel data streams; and
   decoding each of said eight received parallel data streams.

7. The method of claim 6, wherein the parallel data streams comprise a 10-bit data width encoding eight bit symbols.

8. The method of claim 6, wherein the receiver is in a media-access control chip and receives from a PHY chip that interfaces with a physical transmission medium.

9. The method of claim 6, wherein the receiver is in a PHY chip that interfaces with a physical transmission medium, and receives from a media-access control chip.

10. One or more computer-readable non-transitory storage media embodying software that is operable when executed to:
    receive, from a single chip, eight parallel data streams having a first data rate;
    multiplex by round-robin selection the eight parallel data streams into a single multiplexed data stream having the eight parallel data streams;
    maintain DC bias on the multiplexed data stream having the eight parallel data streams by encoding the multiplexed data stream having the eight parallel data streams using a single self-synchronous scrambler;
    serialize the modified multiplexed data stream, by a single serializer/deserializer chip, into a serial data stream having a second data rate that is approximately equal to ten times the first data rate; and
    transmit to a receiver the modified serial data stream at the second data rate.

11. The media of claim 10, wherein the parallel data streams comprise a 10-bit data width encoding eight-bit symbols.

12. The media of claim 10, wherein the transmitter is in a media-access control chip and transmits to a PHY chip that interfaces with a physical transmission medium.

13. The media of claim 10, wherein the receiver is in a PHY chip that interfaces with a physical transmission medium, and transmits to a media-access control chip.

14. The media of claim 10, wherein the second data rate is approximately equal to 10.3125 times the first data rate.

15. One or more computer-readable non-transitory storage media embodying software that is operable when executed to:
    receive, from a single chip, eight parallel data streams having a first data rate;
    multiplex by round-robin selection the eight parallel data streams into a first single multiplexed data stream having the eight parallel data streams;

maintain DC bias on the multiplexed data stream having the eight parallel data streams by encoding the multiplexed data stream having the eight parallel data streams using a single self-synchronous scrambler;

serialize the modified multiplexed data stream, by a single serializer/deserializer chip, into a serial data stream having a second data rate that is approximately equal to ten times the first data rate;

transmit to a receiver the serial data stream at the second data rate;

receive, at the receiver coupled to a transmitter, the serial data stream;

de-serialize, by a single serializer/deserializer chip, the serial data stream into a second single multiplexed data stream;

de-multiplex, through a de-multiplexer, the second single multiplexed data stream into eight received parallel data streams; and decode each of said eight received parallel data streams.

16. The media of claim 15, wherein the parallel data streams comprise a 10-bit data width encoding eight bit symbols.

17. The media of claim 15, wherein the receiver is in a media-access control chip and receives from a PHY chip that interfaces with a physical transmission medium.

18. The media of claim 15, wherein the receiver is in a PHY chip that interfaces with a physical transmission medium, and receives from a media-access control chip.

19. A system comprising:

means for receiving, from a single chip, eight parallel data streams having a first data rate;

means for multiplexing by round-robin selection the eight parallel data streams into a single multiplexed data stream having the eight parallel data streams;

means for maintaining DC bias on the multiplexed data stream having the eight parallel data streams by encoding the multiplexed data stream having the eight parallel data streams using a single self-synchronous scrambler;

means for serializing the modified multiplexed data stream, by a single serializer/deserializer chip, into a serial data stream having a second data rate that is approximately equal to ten times the first data rate; and means for transmitting to a receiver the modified serial data stream at the second data rate.

20. The system of claim 19, wherein the parallel data streams comprise a 10-bit data width encoding eight-bit symbols.

21. The system of claim 19, wherein the means for transmitting is in a media-access control chip and transmits to a PHY chip that interfaces with a physical transmission medium.

22. The system of claim 19, wherein the means for transmitting is in a PHY chip that interfaces with a physical transmission medium, and transmits to a media-access control chip.

23. The system of claim 19, wherein the second data rate is approximately equal to 10.3125 times the first data rate.

24. A system comprising:

means for receiving, from a single chip, eight parallel data streams having a first data rate;

means for multiplexing by round-robin selection the eight parallel data streams into a first single multiplexed data stream having the eight parallel data streams;

means for maintaining DC bias on the multiplexed data stream having the eight parallel data streams by encoding the multiplexed data stream having the eight parallel data streams using a single self-synchronous scrambler;

means for serializing the modified multiplexed data stream, by a single serializer/deserializer chip, into a serial data stream having a second data rate that is approximately equal to ten times the first data rate;

means for transmitting to a receiver the serial data stream at the second data rate;

means for receiving, at the receiver coupled to a transmitter, the serial data stream;

means for de-serializing, by a single serializer/deserializer chip, the serial data stream into a second single multiplexed data stream;

means for de-multiplexing, through a de-multiplexer, the second single multiplexed data stream into eight received parallel data streams; and means for decoding each of said eight received parallel data streams.

25. The system of claim 24, wherein the parallel data streams comprise a 10-bit data width encoding eight bit symbols.

26. The system of claim 24, wherein the means for receiving is in a media-access control chip and receives from a PHY chip that interfaces with a physical transmission medium.

27. The system of claim 24, wherein the means for receiving is in a PHY chip that interfaces with a physical transmission medium, and receives from a media-access control chip.

* * * * *